US010999090B2

(12) United States Patent
Vivekanandan et al.

(10) Patent No.: US 10,999,090 B2
(45) Date of Patent: May 4, 2021

(54) MULTICAST FLOW PRIORITIZATION

(71) Applicant: Juniper Networks, Inc., Sunnyvale, CA (US)

(72) Inventors: Sanoj Kadavil Vivekanandan, Bangalore (IN); Robert W. Kebler, Newburyport, MA (US); Vikram Nagarajan, Chennai (IN); Anish Peter, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 200 days.

(21) Appl. No.: 15/396,329

(22) Filed: Dec. 30, 2016

(65) Prior Publication Data
US 2018/0191515 A1 Jul. 5, 2018

(51) Int. Cl.
*H04L 12/18* (2006.01)
*H04L 12/46* (2006.01)
*H04L 29/12* (2006.01)

(52) U.S. Cl.
CPC ........ *H04L 12/185* (2013.01); *H04L 12/1881* (2013.01); *H04L 12/4641* (2013.01); *H04L 61/6077* (2013.01)

(58) Field of Classification Search
CPC .............. H04L 12/185; H04L 12/1881; H04L 12/4641; H04L 61/6077
USPC ........................................................ 370/390
See application file for complete search history.

(56) References Cited

U.S. PATENT DOCUMENTS

| 6,690,939 B1 | 2/2004 | Jonsson et al. |
| 7,945,936 B2 | 5/2011 | Yamagishi et al. |
| 9,762,403 B2 | 9/2017 | Keesara et al. |
| 2007/0133530 A1* | 6/2007 | Previdi ................. H04L 12/185 370/390 |

(Continued)

FOREIGN PATENT DOCUMENTS

| CN | 101247249 A | 8/2008 |
| CN | 102075417 A | 5/2011 |

(Continued)

OTHER PUBLICATIONS

Optimization of Open Flow Multi-Table Lookup Process for Flows Having Conflicting Priority, Sep. 20, 2016 (Year: 2016).*

(Continued)

*Primary Examiner* — Pankaj Kumar
*Assistant Examiner* — Kokou R Detse
(74) *Attorney, Agent, or Firm* — Shumaker & Sieffert, P.A.

(57) ABSTRACT

Techniques are described for multicast flow prioritization in protocol independent multicast (PIM) networks with multicast flow limits. According to the disclosed techniques, once a router has reached its multicast flow limit, the router may preempt an installed lower priority multicast flow with a newly requested higher priority multicast flow. For example, if a maximum number of multicast flows are installed on the router, then, upon receiving a PIM join for a higher priority flow as compared to the installed flows, the router replaces one of the installed lower priority flows with the received higher priority flow. Furthermore, according to the disclosed techniques, priority values for multicast flows are consistent across a PIM domain and each of the routers within the PIM domain is configured to use the priority values to select a higher priority flow over a lower priority flow.

18 Claims, 8 Drawing Sheets

(56) References Cited

U.S. PATENT DOCUMENTS

| | | | |
|---|---|---|---|
| 2010/0094981 A1* | 4/2010 | Cordray | H04L 41/20 709/222 |
| 2011/0075572 A1* | 3/2011 | Serbest | H04L 12/1868 370/248 |
| 2011/0090792 A1* | 4/2011 | Ronneke | H04L 47/10 370/232 |
| 2013/0107725 A1* | 5/2013 | Jeng | H04L 45/16 370/248 |
| 2013/0201988 A1* | 8/2013 | Zhou | H04L 12/18 370/390 |
| 2014/0003246 A1 | 1/2014 | Han et al. | |
| 2014/0003281 A1* | 1/2014 | Han | H04L 12/18 370/253 |
| 2015/0139228 A1* | 5/2015 | Wijnands | H04L 45/74 370/390 |
| 2015/0288540 A1* | 10/2015 | Kotalwar | H04L 12/4679 370/254 |
| 2016/0241911 A1 | 8/2016 | Shah | |
| 2017/0118033 A1* | 4/2017 | Srinivasan | H04L 12/18 |
| 2017/0289216 A1* | 10/2017 | N | H04L 45/50 |
| 2018/0083876 A1* | 3/2018 | Sharma | H04L 45/745 |

FOREIGN PATENT DOCUMENTS

| | | |
|---|---|---|
| CN | 104662837 A | 5/2015 |
| CN | 105915458 A | 8/2016 |
| WO | 2016/128946 A1 | 8/2016 |

OTHER PUBLICATIONS

Search Report from counterpart European Application No. 17198851.2 dated May 11, 2018, 5 pp.

Adams, et al., "Protocol Independent Multicast—Dense Mode (PIM-DM): Protocol Specification (Revised)," Network Working Group, (IETF) RFC 3973, Jan. 2005, 61 pp.

Fenner et al., "Protocol Independent Multicast—Sparse Mode (PIM-SM): Protocol Specification (Revised)," Network Working Group, RFC 4601, Aug. 2006, 112 pp.

Holbrock et al., "Source-Specific Multicast for IP," Network Working Group, RFC 4607, Aug. 2006, 19 pp.

Handley et al., "Bidirectional Protocol Independent Multicast (BIDIR-PIM)," Network Working Group, RFC 5015, Oct. 2007, 43 pp.

Rosen et al., "Multicast in MPLS/BGP IP VPNs," Internet Engineering Task Force (IETF), RFC 6513, Feb. 2012, 88 pp.

Aggarwal et al., "BGP Encodings and Procedures for Multicast in MPLS/BGP IP VPNs," Internet Engineering Task Force (IETF), RFC 6514, Feb. 2012, 59 pp.

Boers et al., "The Protocol Independent Multicast (PIM) Join Attribute Force," Network Working Group, RFC 5384, Nov. 2008, 10 pp.

Sangli et al., "BGP Extended Communities Attribute," Network Working Group, RFC 4360, Feb. 2006, 12 pp.

Rosen et al., "IANA Registries for BGP Extended Communities," Internet Engineering Task Force (IETF), RFC 7153, Mar. 2014, 16 pp.

Response filed Jan. 3, 2019 to the Search Report from counterpart European Application No. 17198851.2 dated May 11, 2018, 12 pp.

Notice of Intent to Grant and Text Intended to Grant from counterpart European Application No. 17198851.2, dated Mar. 21, 2019, 38 pp.

First Office Action and Search Report, and translation thereof, from counterpart Chinese Application No. 201710908404.4, dated Jun. 3, 2020, 9 pp.

* cited by examiner

MULTICAST FLOW PRIORITIZATION

TECHNICAL FIELD

The invention relates to computer networks and, more particularly, to distribution of multicast traffic over computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), multicast virtual private networks (MVPNs), local area network (LANs), virtual LANs (VLANs) and the like. In some cases, the computer network may be configured to support multicast traffic, such as Internet Protocol Television (IPTV), desktop conferences, corporate broadcasts, music and video web casts, and other forms of multimedia content. As an example, the computer network may utilize protocol independent multicast (PIM) as a multicast routing protocol to build distribution trees through the computer network for the transmission of multicast traffic from sources to receivers or subscriber devices for particular multicast groups. PIM may operate in several different modes, including Dense Mode (DM), Sparse Mode (SM) in Source-Specific Multicast (SSM) mode or Any Source Multicast (ASM) mode, and Bidirectional (BIDIR) mode.

SUMMARY

In general, this disclosure describes techniques for performing multicast flow prioritization in protocol independent multicast (PIM) networks with multicast flow limits. According to various aspects of the disclosed techniques, once a router has reached its multicast flow limit, the router may preempt an installed lower priority multicast flow with a newly requested higher priority multicast flow. For example, if a maximum number of multicast flows are installed on the router, then, upon receiving a PIM join for a higher priority flow as compared to the currently installed multicast flows, the router replaces one of the installed lower priority flows with the received higher priority flow. Furthermore, according to the disclosed techniques, priority values for multicast flows are consistent across a PIM domain and each of the routers within the PIM domain is configured to use the priority values to select a higher priority flow over a lower priority flow. The priority values of each of the multicast flows may be initially set on one or more of the routers within the PIM domain by a network administrator via a command line interface or by a centralized controller.

In one example, this disclosure is directed to a method comprising receiving, by a router, a PIM join message indicating at least one requested multicast flow; determining, by the router, whether a number of installed multicast flows in a multicast state table stored at the router has reached a multicast flow limit associated with the router; based on the multicast flow limit being reached, comparing, by the router, a priority value for the requested multicast flow to a priority value for one of the installed multicast flows in the multicast state table; and based on the priority value for the requested multicast flow being higher than the priority value for the one of the installed multicast flows, deleting the one of the installed multicast flows from the multicast state table, and installing the requested multicast flow in the multicast state table.

In another example, this disclosure is direct to a router comprising a memory configured to store a multicast state table including one or more installed multicast flows; and one or more processors in communication with the memory. The one or more processors are configured to receive a PIM join message indicating at least one requested multicast flow; determine whether a number of the installed multicast flows in the multicast state table has reached a multicast flow limit associated with the router; based on the multicast flow limit being reached, compare a priority value for the requested multicast flow to a priority value for one of the installed multicast flows; and based on the priority value for the requested multicast flow being higher than the priority value for the one of the installed multicast flows, delete the one of the installed multicast flows from the multicast state table, and install the requested multicast flow in the multicast state table.

A non-transitory computer-readable storage medium storing instructions that when executed cause one or more processors of a router to receive a PIM join message indicating at least one requested multicast flow; determine whether a number of installed multicast flows in a multicast state table stored at the router has reached a multicast flow limit associated with the router; based on the multicast flow limit being reached, compare a priority value for the requested multicast flow to a priority value for one of the installed multicast flows; and based on the priority value of the requested multicast flow being higher than the priority value for the one of the installed multicast flows, delete the one of the installed multicast flows from the multicast state table, and install the requested multicast flow in the multicast state table.

The details of one or more examples of the invention are set forth in the accompanying drawings and the description below. Other features, objects, and advantages of the invention will be apparent from the description and drawings, and from the claims.

DETAILED DESCRIPTION

Figure 1A:
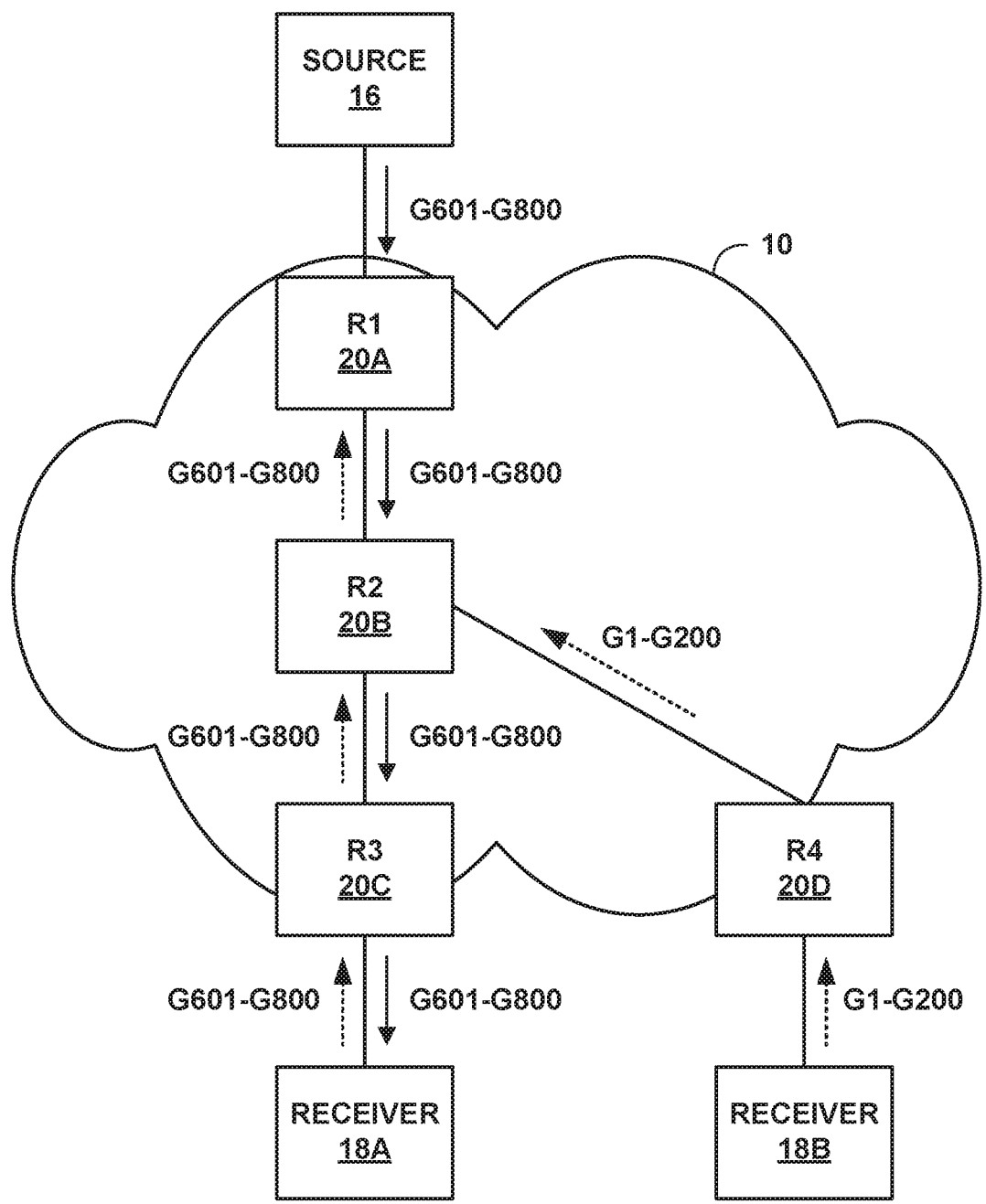
FIGS. 1A-1B are block diagrams illustrating an example computer network including routers configured to forward traffic of prioritized multicast flows over a multicast tree established using PIM SSM, in accordance with the techniques of this disclosure.
Figure 1B:
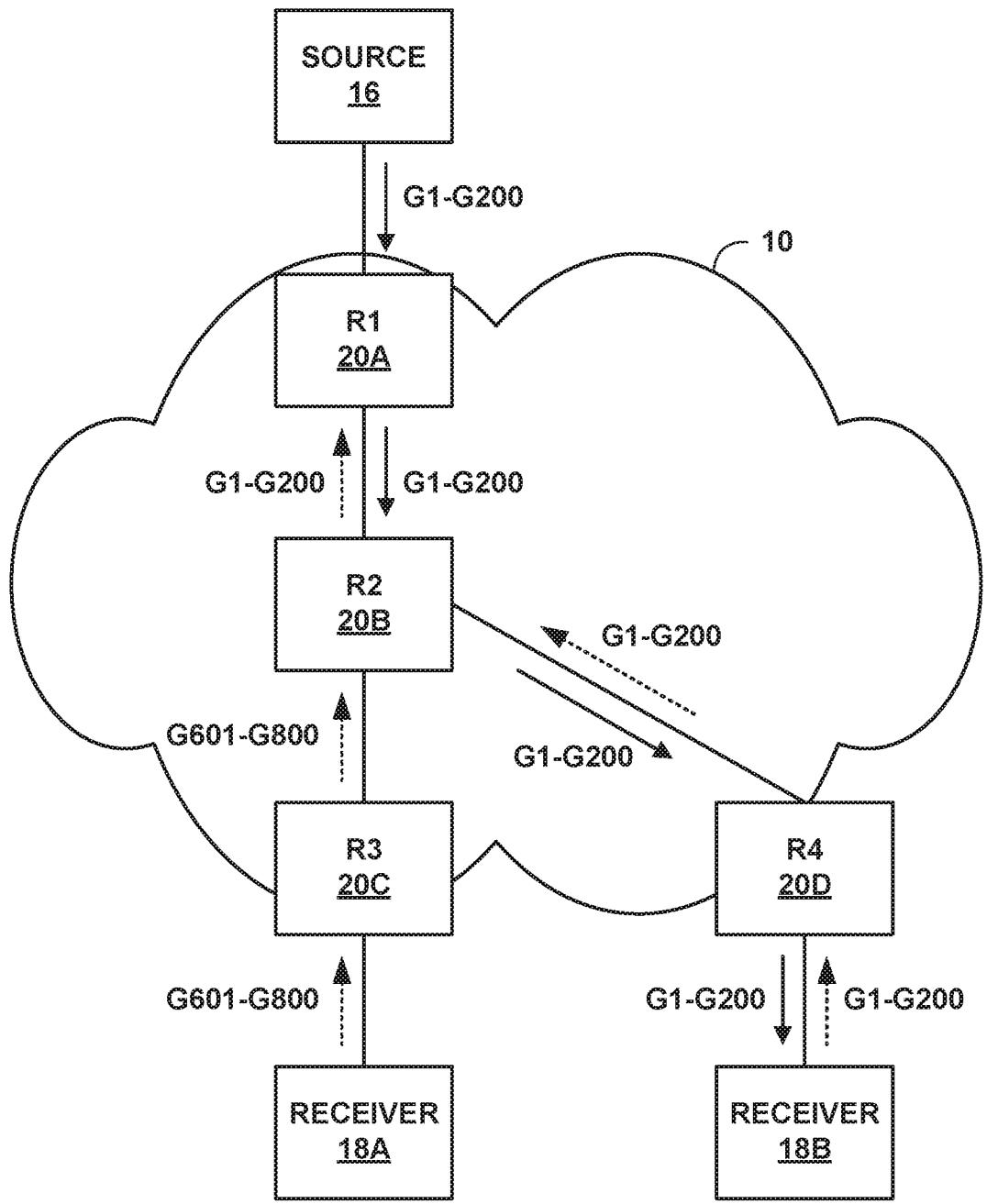

FIGS. 1A-1B are block diagrams illustrating an example computer network 10 including routers configured to forward traffic of prioritized multicast flows over a multicast tree established using protocol independent multicast (PIM) source-specific multicast (SSM) between a source 16 and receivers 18A-18B (collectively "receivers 18"), in accordance with the techniques of this disclosure. In FIGS. 1A-1B, the dashed arrows indicate PIM Join messages sent toward source 16, and the solid arrows indicate multicast traffic being forwarded towards receivers 18.

Network 10 may comprise a private network or a public network, such as the Internet. For example, network 10 may be an enterprise network, a campus network, a service provider network, a home network, a local area network (LAN), a virtual local area network (VLAN), virtual private network (VPN), or another autonomous system. In any of these examples, remotely located source 16 and receivers 18 may share data via network 10. In an example of network 10 as an enterprise network, each of source 16 and receiver 18 may comprise one or more servers or employee computer terminals located in different regions of a single office location, or may comprise a remote office location of a corporation.

In the illustrated example, network 10 comprises an Internet Protocol (IP) network including routing devices that use the PIM protocol to route multicast traffic through network 10 between source 16 and receivers 18 for particular multicast groups. Network 10 includes routers (R1-R4) 20A-20D (collectively "routers 20"). R1 20A is a first hop router (FHR) connected to source 16, R2 20B is a transit router, R3 20C is a last hop router (LHR) connected to receiver 18A, and R4 20D is a LHR connected to receiver 18B. In a typical network topology that utilizes the PIM protocol, additional transit routers may be included between FHR R1 20A and LHRs R3 20C and R4 20D. For purposes of illustration, these additional routers are not shown in FIGS. 1A-1B.

Each of source 16 and receivers 18 may be included in a remote site (not shown) that may be a local area network (LAN) or a wide area network (WAN) comprising a plurality of subscriber devices, such as desktop computers, laptops, workstations, personal digital assistants (PDAs), Internet of Things (IOT) devices, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content. Source 16 may provide traffic for one or more multicast groups. Receivers 18 may each request or subscribe to traffic from one or more multicast groups. In other examples, routers within network 10 may be connected to more than one source and/or more or less than two receivers.

The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. Additional information regarding PIM protocols may be found in Adams, A., et al., "Protocol Independent Multicast Version 2—Dense Mode Specification," IETF RFC 3973, 2005; Fenner, B., et al., "Protocol Independent Multicast—Sparse Mode (PIM-SM): Protocol Specification (Revised)," IETF RFC 4601, 2006; Holbrook, H. and B. Cain, "Source-Specific Multicast for IP," IETF RFC 4607, 2006; and Handley, M., et al., "Bidirectional Protocol Independent Multicast (BIDIR PIM)," IETF RFC 5015, 2007, the entire content of each of which are incorporated by reference herein.

PIM is a predominantly used multicast routing protocol used to establish multicast trees within a network between source(s) and receiver(s). As deployments are increasing in scale, network service providers may find the need to apply some maximum limit on the multicast flows (i.e., channels) allowed to a customer site (e.g., each of receivers 18). Applying a multicast flow limit, however, introduces a need for customers to prioritize certain multicast flows so that high priority multicast flows are preferred over other multicast flows and not blocked, dropped, or ignored due to the multicast flow limit. In addition, the multicast flow prioritization may provide a certain amount of consistency by identifying which of the multicast flows should always be installed regardless of the order in which the requests for the multicast flows are received.

Figure 2:
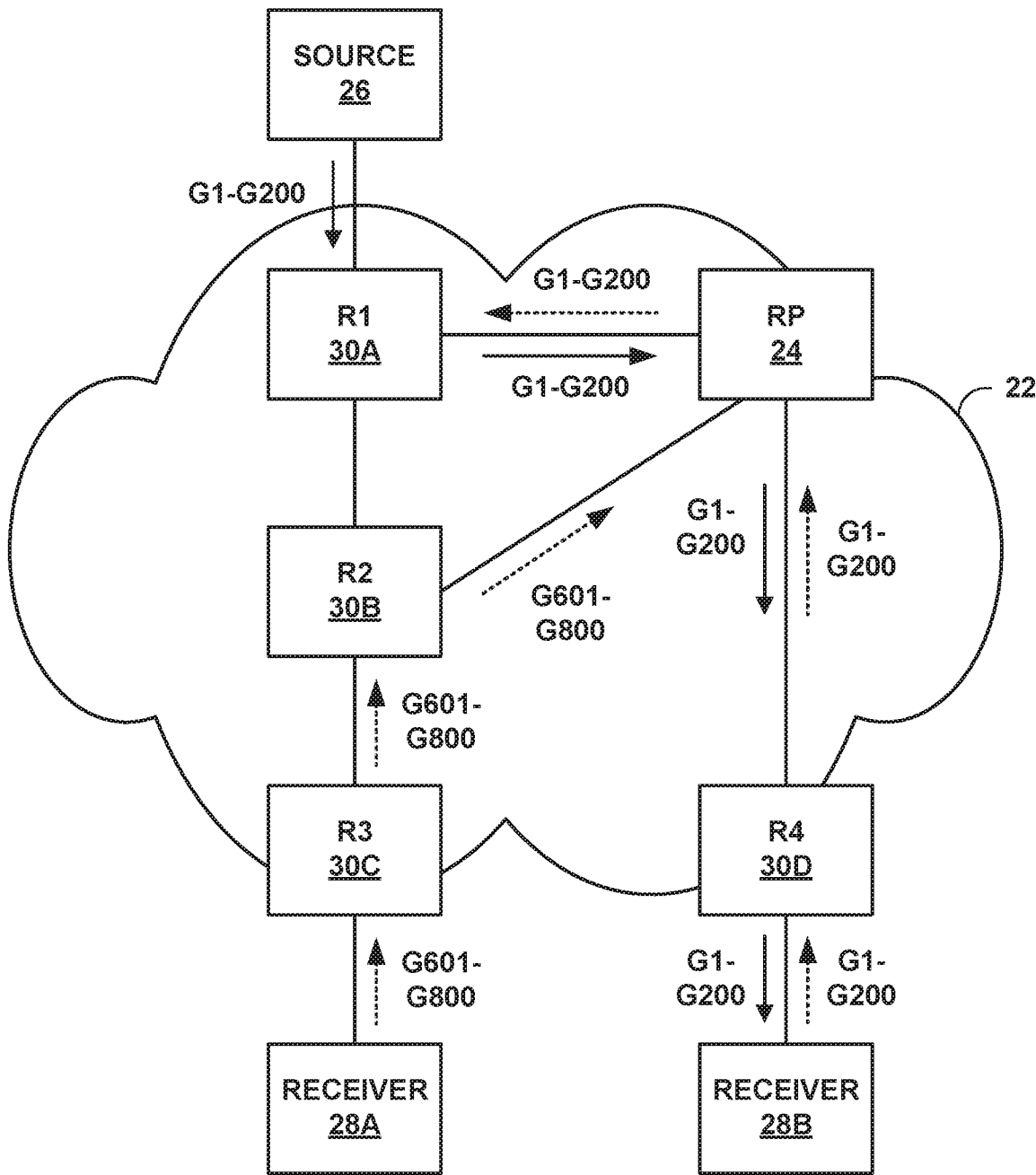
FIG. 2 is block diagram illustrating another example computer network including routers configured to forward traffic of prioritized multicast flows over a multicast tree established using PIM ASM, in accordance with the techniques of this disclosure.
Figure 3:
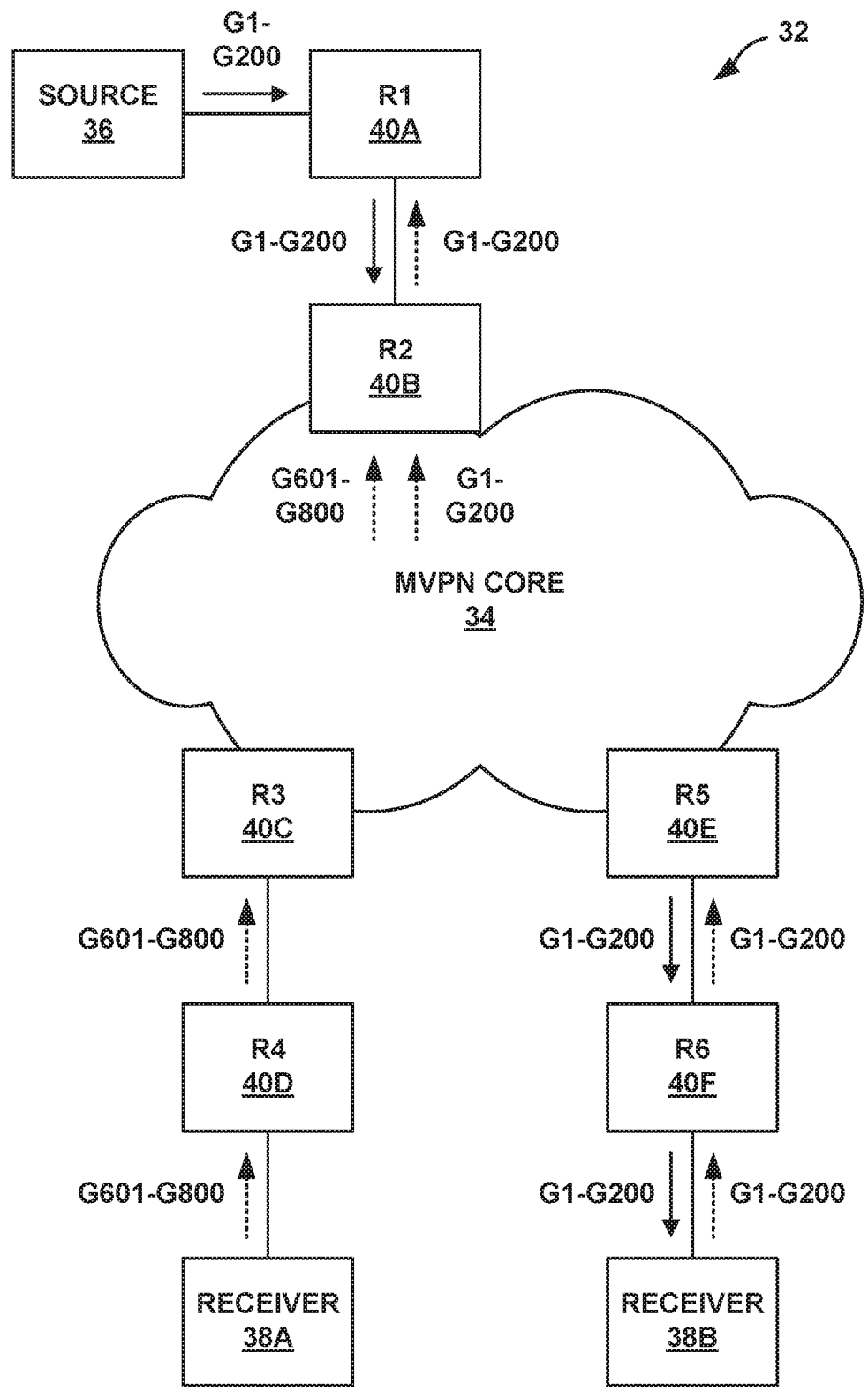
FIG. 3 is a block diagram illustrating another example computer network including routers configured to forward traffic of prioritized multicast flows over a multicast tree established using PIM across an MVPN core, in accordance with the techniques of this disclosure.

The examples in FIGS. 1A-1B and FIG. 3 are depicted using PIM SSM mode, but the problem and the solutions described in this disclosure are also applicable for PIM ASM mode, which is depicted in the example of FIG. 2.

In the example of FIGS. 1A-1B, in network 10, there are about 1000 multicast flows with associated unique multicast group addresses ranging from G1 to G1000, and corresponding sources, including source 16, sending traffic to each of these groups. Each of the multicast flows may represent a channel to carry multicast traffic of a given one of the multicast groups. Receivers 18A and 18B are behind router R3 20C and router R4 20D, respectively, and source 16 is behind router R1 20A. In this example, all of the multicast flows are PIM SSM and all routers 20 are configured with a multicast flow limit to allow only 200 multicast flows. In the illustrated example, 200 of the 1000 multicast flows in network 10, e.g., from groups G1 to G200, are to be treated with higher priority than the remaining 800 multicast flows. In this case, if receivers 18 are interested in those 200 higher priority multicast flows, the traffic of the higher priority multicast flows should be delivered.

As illustrated in FIG. 1A, receiver 18A behind R3 20C expresses interest for groups G601 to G800 initially, e.g., using PIM join messages. Since this is a case of PIM SSM, when a router receives interest for groups via PIM join messages, the router creates the states for the multicast flow and forwards PIM join messages upstream towards the source. In the illustrated example, R3 20C creates 200 flows (e.g., G601 to G800) and transmits PIM join messages towards R2 20B and R1 20A. Each of these routers also create the 200 multicast entries (e.g., G601 to G800) and thereby all of the routers will have exhausted their maximum multicast flow limits.

Sometime later, receiver 18A behind R3 20C may express interest for rest of the groups G1-G1000, including the high priority groups G1 to G200. In some examples, since a limit of 200 is configured on routers 20 and R3 20C already has states created for G601 to G800, thereby exhausting its limit, R3 20C will process only the existing G601 to G800 flows but will not be able to add any further multicast flows. Since the joins for the rest of the groups are not propagated, receiver 18A will not receive any traffic for groups G1-G600 and G801-G1000, including the high priority flows G1 to G200. With existing mechanisms, routers 20 are not configured to operate with respect to the priority values of the flows, so traffic cannot be forwarded for higher priority flows requested after the maximum limit of multicast flows is reached on routers 20.

With existing mechanisms there may also be inconsistencies because the multicast flows selected or installed on different routers 20 may be based on a first come, first served basis. For example, in the above scenario in which the multicast flows G601-G800 are being serviced, when R3 20C restarts and joins for G801-G1000 are received first by R3 20C after restart, R3 20C will install these flows and thereby exhaust its configured maximum limit of multicast flows. All further joins will be rejected or blocked due to the limit being reached such that receiver 18A (which was previously receiving traffic for flows G601 to G800) may no longer receive traffic due to the restart of upstream router R3 20. With existing implementations of PIM, there may be no way to predetermine which flows will be selected or blocked by the upstream routers.

The above described issues may be even more serious when different routers have different sets of receivers and, based on a first come, first served basis, the routers install different flows without having been configured to operate with respect to the priority values. In this case, receivers behind some of the routers may not receive any traffic at all.

In the example of FIG. 1A, receiver 18A expresses interest for groups G601 to G800 initially. In this case, R3 20C creates 200 flows (e.g., G601 to G800) and transmits the PIM join messages towards R2 20B and R1 20A. Each of these routers also create the 200 multicast entries (e.g., G601 to G800) and thereby all the routers will have exhausted their maximum multicast flow limit. Sometime later, receiver 18B behind R4 20D expresses interest for the groups G1-G200, which are higher priority groups as compared to G601-G800. R4 20D creates 200 flows (e.g., G1 to G200) and transmits PIM join messages towards R2 20B. In some examples, since R2 has exhausted its limit with the existing G601 to G800 flows, it will not be able to add any further multicast flows. In this case, joins for G1-G200 are not propagated further, and receiver 18B will not receive any traffic for these flows.

This disclosure describes techniques for performing multicast flow prioritization in PIM networks with multicast flow limits. According to the disclosed techniques, once a router has reached its multicast flow limit (e.g., the above noted maximum limit of multicast flows), the router may preempt an installed lower priority multicast flow with a newly requested higher priority multicast flow. For example, if a maximum number of multicast flows are installed on the router, then, upon receiving a PIM join for a higher priority flow as compared to the currently installed multicast flows, the router replaces one of the installed lower priority flows with the received higher priority flow. Furthermore, according to the disclosed techniques, priority values for multicast flows are consistent across a PIM domain and each of the routers within the PIM domain is configured to use the priority values to select a higher priority flow over a lower priority flow.

The priority values for the multicast flows may be numerical or non-numerical identifiers defined to indicate a priority associated with a preference for customers to receive the multicast traffic carried by the respective multicast flows. For example, multicast flows carrying traffic that customers must receive or that customers strongly prefer to receive over other traffic may be assigned high priority values. On the other hand, multicast flows carrying traffic that customers do not care whether they receive or not may be assigned low priority values. In one example, the priority values may be integer values, e.g., ranging from 1 to 1000 for the 1000 multicast flows in the PIM domain of network 10. The priority values may be defined such that 1 is the lowest priority value and 1000 is the highest priority value. In other examples, the priority values may be defined such that 1 is the highest priority value and 1000 is the lowest priority value. Regardless of how the priority values are defined, the priority values for the multicast flows should be pre-defined and consistent, i.e., cannot be changed or configured, across the PIM domain.

The PIM or multicast domain may include all sources and all receivers that use the same or at least partially overlapping multicast routes for the transfer of multicast traffic. In some examples the PIM or multicast domain may be defined by an open shortest path first (OSPF) area or an autonomous system border router (ASBR) boundary. In general, the PIM or multicast domain does not cross different autonomous numbers (ASNs), which uniquely identify autonomous systems within the Internet. The priority values of each of the multicast flows may be initially set on one or more of the routers within the PIM domain by a network administrator via a command line interface (CLI) or programmed via a centralized controller, e.g., using an application programming interface (API).

According to the disclosed techniques, when a number of installed multicast flows installed on a router has reached a multicast flow limit associated with the router, if the router receives a PIM join message indicating a new requested multicast flow, the router compares a priority value for the requested flow to a priority value for a multicast flow currently installed on the router. If the newly requested flow has a higher priority value than the priority value for the installed flow, the router deletes the installed flow and installs the newly requested, higher priority multicast flow.

As an example, in the case described above in which R1-R3 20A-20C have exhausted their multicast flow limits with multicast state for groups G601-800, receiver 18A behind R3 20C may express interest for the rest of the groups G1-G1000, including the high priority groups G1 to G200. The disclosed techniques enable each of R1-R3 20A-20C to compare the priority for flows of groups G1-G1000 to each of the multicast flows of groups G601-800 currently installed on the router. Each of R1-R3 20A-20C may then delete the lower priority flows and install the higher priority multicast flows, which, in this example, may include deleting flows of groups G601-800 and installing flows of high priority groups G1 to G200.

As another example, as illustrated in FIG. 1B, each of R1-R3 20A-20C has exhausted its multicast flow limit with multicast state for groups G601-800, and receiver 18B behind R4 20D expresses interest for the groups G1-G200, which are higher priority groups as compared to G601-G800. The disclosed techniques enable R2 20B to compare the priority of flows for groups G1-G200 to each of the multicast flows G601-800 currently installed on R2 20B. R2 20B may then delete the lower priority flows and install the higher priority multicast flows, which, in this example, includes deleting flows of groups G601-800 and installing flows of high priority groups G1 to G200.

As shown in FIG. 1B, R2 20B deletes multicast state for groups G601-800 and instead creates 200 new flows (e.g., G1 to G200) and transmits PIM join messages towards R1 20A. R1 20A also deletes the previously installed 200 multicast entries for groups G601 to G800, and creates 200 new flows for the higher priority flows for groups G1-G200. In this case, receiver 18B will receive traffic flows for groups G1-G200, and receiver 18A will no longer receive traffic flows for groups G601-800.

FIG. 2 is block diagram illustrating another example computer network 22 including routers configured to forward traffic of prioritized multicast flows over a multicast tree established using PIM ASM between a source 26 and routers 28A-28B (collectively "routers 28"), in accordance with the techniques of this disclosure. In FIG. 2, the dashed arrows indicate PIM Join messages sent toward RP 24, and the solid arrows indicate multicast traffic being forwarded towards receivers 28.

In the illustrated example, network 22 comprises an IP network including routing devices that use a PIM protocol to route multicast traffic through network 22 between source 26 and receivers 28 for particular multicast groups. Network 22 includes routers (R1-R4) 30A-30D (collectively "routers 30"), and rendezvous point (RP) 24. R1 30A is a FHR connected to source 26, R2 30B is a transit router, R3 30C is a LHR connected to receiver 28A, and R4 30D is a LHR connected to receiver 28B. In a typical network topology that utilizes the PIM ASM protocol, additional transit routers may be included between FHR R1 20A, RP 24, and LHRs R3 20C and R4 20D. For purposes of illustration, these additional routers are not shown in FIG. 2.

In the PIM ASM mode, which is described in more detail in RFC 4601 cited above, a RP, e.g., RP 24, is the root of all multicast trees built in the network and stores information, including source addresses, for all multicast flows in the network. PIM ASM describes a mechanism in which multicast functionality is accomplished by first building a shared tree rooted at RP 24 and then building a shortest path source tree rooted at FHR R1 30A and pruning the shared tree to instead use the source tree. These different trees are built for ASM because the LHRs, e.g., R3 30C and R4 30D, with interested receivers do not have knowledge of the sources, e.g., source 26, of the multicast traffic. In the example of FIG. 2, each of R3 30C and R4 30D first sends PIM joins to RP 24 to build the shared tree and learn the source address of the source, e.g., source 26, of requested multicast traffic. Upon discovering source 26, each of R3 30C and R4 30D may later establish the shortest path tree rooted at R1 30A.

In the example of FIG. 2, in network 22, there are about 1000 multicast flows with associated unique multicast groups addresses ranging from G1 to G1000, and corresponding sources, including source 26, sending traffic to each of these groups. All routers 30 are configured with a multicast flow limit to allow only 200 multicast flows. In the illustrated example, 200 of the 1000 multicast flows in network 22, e.g., from groups G1 to G200, are to be treated with higher priority than the remaining 800 multicast flows.

As illustrated in FIG. 2, receiver 28A expresses interest for groups G601 to G800 initially. In response, R3 30C creates 200 flows (e.g., G601 to G800) and transmits the PIM join messages towards R2 30B and RP 24. In this case, although not shown in FIG. 2, RP 24 transmits the PIM join messages for groups G601-G800 to R1 30A. All these routers also create the 200 multicast entries (e.g., G601 to G800) and thereby all the routers will have exhausted their maximum multicast flow limit.

Sometime later, receiver 28B behind R4 30D expresses interest for the groups G1-G200, which are higher priority groups as compared to G601-G800. R4 30D creates 200 flows (e.g., G1 to G200) and transmits the PIM join messages towards RP 24. The disclosed techniques enable RP 24 to compare the priority of flows for groups G1-G200 to each of the multicast flows G601-800 currently installed on RP 24. RP 24 may then delete the lower priority flows and install the higher priority multicast flows, which, in this example, includes deleting flows of groups G601-800 and installing flows of high priority groups G1 to G200. RP 24 deletes multicast state for groups G601-800 and instead creates 200 flows (e.g., G1 to G200) and transmits PIM join messages towards R1 30A. R1 30A also deletes the previous 200 multicast entries for groups G601 to G800, and creates 200 new flows for the higher priority flows for groups G1-G200. In this case, receiver 28B receives traffic flows for groups G1-G200 via RP 24, and receiver 28A will no longer receive traffic flows for groups G601-800.

FIG. 3 is a block diagram illustrating another example computer network 32 including routers configured to forward traffic of prioritized multicast flows over a multicast tree established using PIM across a multicast virtual private network (MVPN) core 34 between source 36 and receivers 38A-38B (collectively "receivers 38"), in accordance with the techniques of this disclosure. In FIG. 3, the dashed arrows indicate PIM Join messages sent toward source 36, and the solid arrows indicate multicast traffic being forwarded towards receivers 38.

In the illustrated example, network 32 comprises multiple remote IP networks connected via MVPN 34. Each of the IP networks includes routing devices that use a PIM protocol to route multicast traffic through the network. Network 32 includes routers (R1-R6) 40A-40F (collectively "routers 40"). R1 40A is a FHR connected to source 36 and R2 30B is a provider edge (PE) router on the source side of MVPN core 34. R3 40C is a PE router on the receiver side of MVPN core 34 and R4 40D is a LHR connected to receiver 38A, and R5 40E is PE router on the receiver side of MVPN core 34 and R6 40F is a LHR connected to receiver 38B.

In order to transmit the PIM messages across MVPN 34, the PIM messages are converted into BGP MVPN route messages. For example, at R3 40C or R5 40E, PIM *,G joins may be converted into MVPN Type 6 shared tree join routes, and PIM S,G joins may be converted into MVPN Type 7 source tree join routes. These MVPN routes are exported to a BGP table and sent across MVPN core 34 to the remote router R2 40B where they may be converted back to PIM joins for propagating further upstream. Additional information regarding MVPN may be found in Rosen, E., et al., "Multicast in MPLS/BGP IP VPNs," RFC 6513, February 2012, and Rosen, E., et al., "BGP Encodings and Procedures for Multicast in MPLS/BGP IP VPNs," RFC 6514, February 2012, the entire content of each of which are incorporated by reference herein.

The same complexities as described above with respect to FIGS. 1A-1B may be seen in the case of deployment of multicast networks across various geographies on virtual routing instances, e.g., MVPN core 34. In the example of FIG. 3, in network 32, there are about 1000 multicast flows with associated unique multicast groups addresses ranging from G1 to G1000, and corresponding sources, including source 36, sending traffic to each of these groups. Consider that all routers 40 are part of the same virtual routing and forwarding (VRF) instance and the customer would like to enforce that groups G1-G200 have higher priority such that interested receivers always receive multicast traffic of groups G1-G200, while the traffic for the remaining 800 flows are not mandatorily enforced to be delivered.

As illustrated in FIG. 3, receiver 38A expresses interest for groups G601 to G800 initially. In this case R4 40D creates 200 flows (e.g., G601 to G800) and transmits the PIM join messages towards R3 40C and across MVPN core 34 to R2 40B. In this case, although not shown in FIG. 3, R2 40B transmits the PIM join messages for groups G601-G800 to R1 40A. All these routers also create the 200 multicast entries (e.g., G601 to G800) and thereby all the routers will have exhausted their maximum multicast flow limit.

Sometime later, receiver 38B behind R6 40F expresses interest for the groups G1-G200, which are higher priority groups as compared to G601-G800. R6 30F creates 200 flows (e.g., G1 to G200) and transmits the PIM join messages towards R5 40E and across MVPN core 34 to R2 40B. The disclosed techniques enable R2 40B to compare the priority of flows for groups G1-G200 to each of the multicast flows G601-800 currently installed on R2 40B. R2 40B may then delete the lower priority flows and install the higher priority multicast flows, which, in this example, includes deleting flows of groups G601-800 and installing flows of high priority groups G1 to G200. As shown in FIG. 3, R2 40B deletes multicast state for groups G601-800 and instead creates 200 flows (e.g., G1 to G200) and transmits PIM join messages towards R1 40A. R1 40A also deletes the previous 200 multicast entries for groups G601 to G800, and creates 200 new flows for the higher priority flows for groups G1-G200. In this case, receiver 38B will receive traffic flows for groups G1-G200, and receiver 38A will no longer receive traffic flows for groups G601-800.

Figure 4:
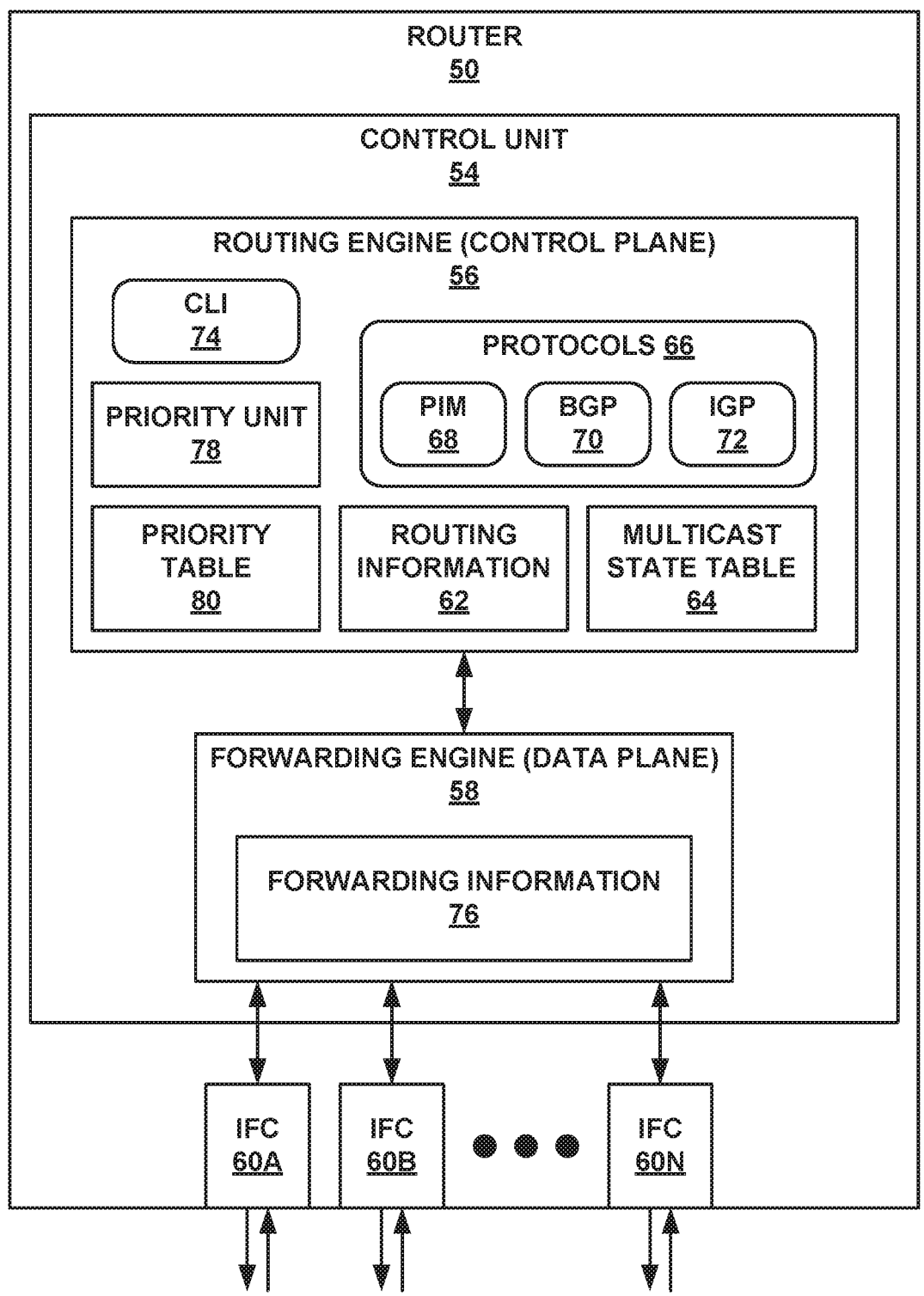
FIG. 4 is a block diagram illustrating an example router configured to perform the disclosed techniques of multicast flow prioritization.

FIG. 4 is a block diagram illustrating an example router 50 configured to perform the disclosed techniques of multicast flow prioritization. In one example, router 50 may operate as a last hop router (LHR) connected to a receiver and configured to establish a communication channel with a rendezvous point (RP) or directly with a first hop router connected to a source. In other examples, router 50 may operate as a RP or controller router configured to manage PIM messaging and multicast tree creation in the network. In still other examples, router 50 may operate as any of the last hop routers, first hop routers or transit routers in the computer networks illustrated in FIG. 1A-1B, 2, or 3.

In the illustrated example of FIG. 4, router 50 includes interface cards 60A-60N ("IFCs 60") that receive multicast packets via incoming links and send multicast packets via outbound links. IFCs 60 are typically coupled to the incoming links and the outbound links via a number of interface ports. Router 50 also includes a control unit 54 that determines routes of received packets and forwards the packets accordingly via IFCs 60.

Control unit 54 includes a routing engine 56 and a forwarding engine 58. Routing engine 56 operates as the control plane for router 50 and includes an operating system that may provide a multi-tasking operating environment for execution of a number of concurrent processes. For example, routing engine 56 provides an operating environment for various protocols 66 that perform routing functions for router 50. In the illustrated example of FIG. 4, routing engine 56 includes a border gateway protocol (BGP) 70 and an interior gateway protocol (IGP) 72 as unicast routing protocols used to exchange routing information with other routing devices in a network in order to discover the network topology and update routing information 62. In the examples described in this disclosure, IGP 72 may be a link-state routing protocol such as open shortest path first (OSPF) or intermediate system-intermedia system (IS-IS). In addition, routing engine 56 includes PIM 68 as a multicast routing protocol used to build multicast distribution trees with the other routing devices in the network using routing information 62 and multicast state information 64.

Routing information 62 may describe the topology of the network in which router 50 resides, and may also describe various routes within the network and the appropriate next hops for each route, i.e., the neighboring routing devices along each of the routes. Routing information 62 may include a list of incoming interfaces (IIFs) and a list of outgoing interfaces (OIFs) that indicate which of IFCs 60 are connected to the neighboring routing devices in each route. For example, a given route may comprise a multicast route for multicast traffic for a given multicast group. In that example, the list of IIFs included in routing information 62 for router 50 may include a list of upstream interfaces for all upstream routers that have PIM state for the given multicast group.

Multicast state information 64 may describe a current status of links to the neighboring routing devices in the multicast distribution trees established using PIM 68. For example, multicast state information 64 may include PIM join states that describe which multicast flows of multicast groups are installed on router 50 and which neighboring routing devices belong to the multicast groups. Routing engine 56 analyzes stored routing information 62 and multicast state information 64 to generate forwarding information 76 installed in forwarding engine 58.

Forwarding engine 58 provides data plane functionality for router 50. Although not shown in FIG. 4, forwarding engine 58 may comprise a central processing unit (CPU), memory and one or more programmable packet-forwarding application-specific integrated circuits (ASICs). Forwarding information 76 associates network destinations with specific next hops and corresponding ports of IFCs 60.

The architecture of router 50 illustrated in FIG. 4 is shown for exemplary purposes only and should not be limited to this architecture. In other examples, router 50 may be configured in a variety of ways. In one example, some of the functionally of control unit 54 may be distributed within IFCs 60. Control unit 54 may be implemented solely in software, or hardware, or may be implemented as a combination of software, hardware, or firmware. For example, control unit 54 may include one or more processors that execute software instructions. In this example, the various software modules of control unit 54 may comprise executable instructions stored on a computer-readable medium, such as computer memory or hard disk.

In accordance with the techniques of this disclosure, router 50 is configured to perform multicast flow prioritization based on a multicast flow limit associated with router 50, and any other routers within a PIM domain. In the example of FIG. 4, routing engine 56 includes a priority unit 78 and a priority table 80. In the example of FIG. 4, router 50 includes a priority unit 78 configured to determine whether a multicast flow limit has been reached, and, if so, preempt a lower priority flow with a higher priority flow. If a maximum number of multicast flows are installed in multicast state information 64, then, upon receiving a PIM join for a higher priority flow as compared to the currently installed flows, priority unit 78 replaces a lower priority one of the current installed flows in PIM state information 64 with the received higher priority flow.

Priority unit 78 of router 50 is configured to learn priority values assigned to one or more of the multicast flows within the PIM domain either from priority table 80, which is pre-programmed with priority values for all multicast flows within the PIM domain, or from received PIM join messages for the multicast flows. For example, the priority values for each of the multicast flows may be pre-programmed into priority table 80 on router 50 by a network administrator via command line configuration using CLI 74 or by a centralized controller via an application programming interface (API), for example. Each of the priority values stored in priority table 80 may be mapped to a unique multicast group address of the respective one of the multicast flows within the PIM domain. Routing engine 56 may then store the set of priority values in priority table 80.

In accordance with the techniques of this disclosure, the priority values for the multicast flows are known and consistent across all routers in the PIM domain. The routers may learn the priority values for the multicast flows according to any of the example approaches described below.

In a first example approach, all routers in the PIM domain are pre-programmed with priority values for all the multicast flows. The priority values for the multicast flows may be configured by an administrator via CLI 74 or programmed by a centralized controller. In this example, the administrator or the controller needs to have access to all the routers in the PIM domain, and configure or program the priority values for all the multicast flows. In the case where the priorities are configured by the administrator, the configuration may be done by leveraging existing policy configurations to map various sets of multicast flows with sets of preset priority values, or introducing a new set of configurations to configure the mapping of flows with priorities. In the case where the priorities are programmed by the controller, a new set of APIs may be introduced to program the priority value for each multicast flow.

One potential issue with this approach is that the administrator or the controller needs to have access to all the routers in the PIM domain. This may be possible in cases where the network is relatively small and included within the same geography, but it may become more complicated as network size increases and spreads across geographies.

In a second example approach, priority values are carried in the PIM Join messages as a new join attribute. In this example, only last hop routers are configured or programmed with priority values via the first example approach described above. The last hop routers then propagate the priority embedded in a PIM join attribute type-length-value (TLV) carried with the PIM join messages, as described in more detail below with respect to FIGS. 5 and 6. As long as the receiving router understands the new PIM join attribute, the receiving route may then extract the priority value associated with the requested multicast flow, and process the join according to the priority value. In the case where the priority value is different for the same flow on different LHRs, a router that receives PIM Join messages for the same flow from both of the LHRs may determine the highest of the received priority values for that same multicast flow and propagate only the request with the highest priority value.

In order for the second example approach to work across an MVPN core, the priority value carried in the PIM join attribute carried with PIM Join message may be transmitted across the MVPN core within an extended community attribute of an MVPN route. For example, a new community may be introduced to carry the priority value for each of the multicast flows, as described in more detail below with respect to FIG. 7.

In a third example approach, priority values for all the multicast flows in the PIM domain are only pre-programmed in an RP or controller router. The priority values for the multicast flows may be configured by an administrator via CLI 74 or programmed by a centralized controller. This example approach may only be applicable for PIM ASM mode. In PIM ASM mode, the RP router is the root of all multicast joins and stores information for all multicast flows in the PIM domain. The RP router, therefore, may also be used as a central point of control to perform multicast flow prioritization for all multicast flows in the PIM domain by applying associated multicast flow limits and mapping multicast flows to priority values by means of configuring policies. Since the RP router is the root of all the multicast flows, the RP router can ensure consistency of priority values across the PIM domain.

This third example approach may work best when the initial flows received and installed on the RP router are higher priority flows. In this case, any further lower priority flows will be rejected by the RP router once the RP router has exhausted its multicast flow limit, and any downstream router will not even know about the lower priority flows. In the case where the RP router has currently installed lower priority flows, once the router has exhausted its multicast flow limit and upon receipt of higher priority flows, the RP router preempts the lower priority flows. In this case, however, the downstream routers will already have installed the previous lower priority flows. The lower priority flows will then need to be timed out of the multicast state tables at the downstream routers before installation of the higher priority flows.

Figure 5:
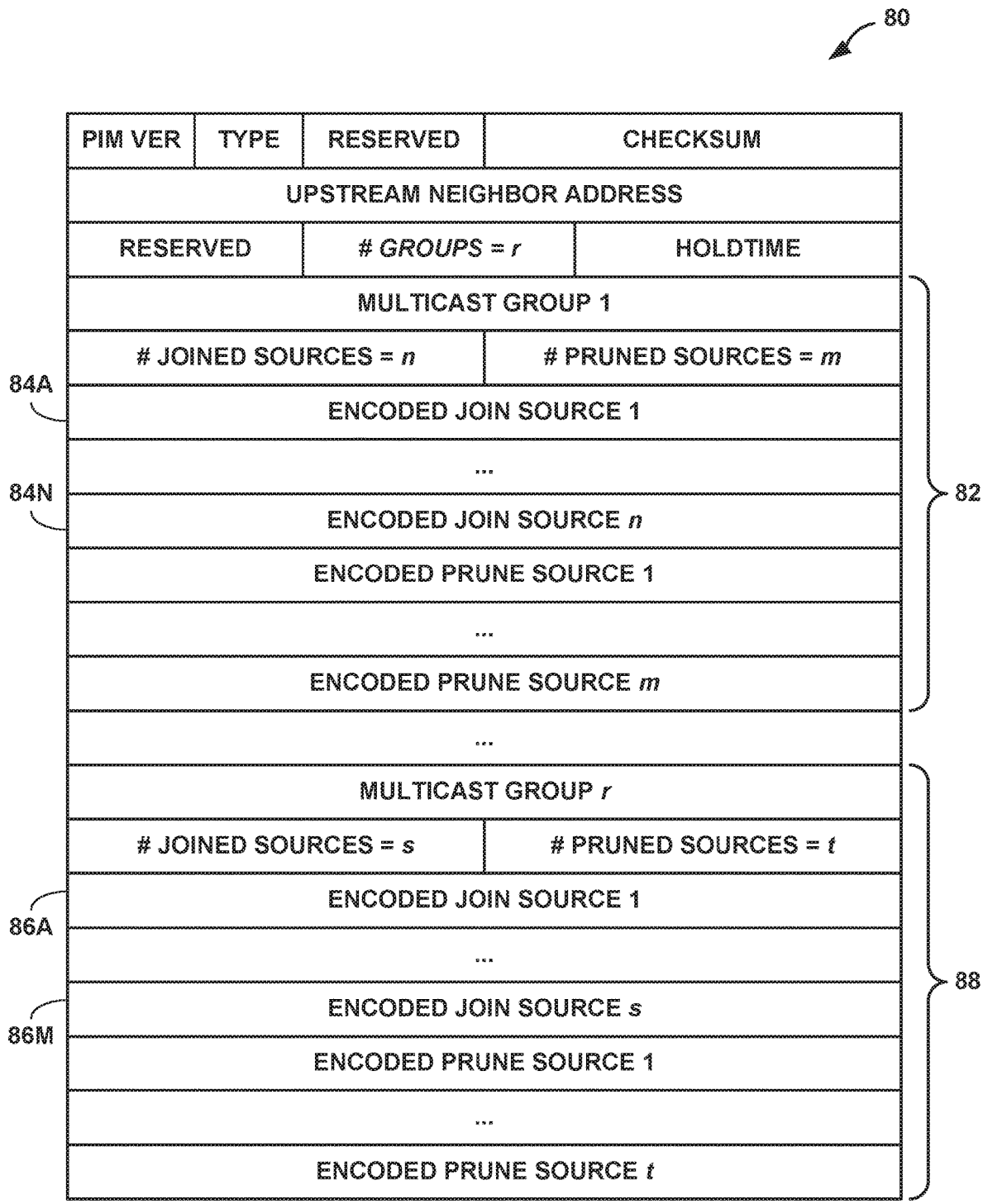
FIG. 5 is a conceptual diagram illustrating an example format of a PIM Join message having multicast flow priority values embedded in a PIM join attribute of an Encoded-Source Address.

FIG. 5 is a conceptual diagram illustrating an example format of a PIM Join message 80 having multicast flow priority values embedded in a PIM join attribute of an Encoded-Source Address, e.g., any of Encoded Join Source 84A-84N for Multicast Group 1 82 or any of Encoded Join Source 86A-86M for Multicast Group r 88. The PIM join attribute is described in more detail in Boers, A., et al., "The Protocol Independent Multicast (PIM) Join Attribute Format," IETF RFC 5384, 2008, the entire content of which is incorporated by reference herein.

Figure 6:
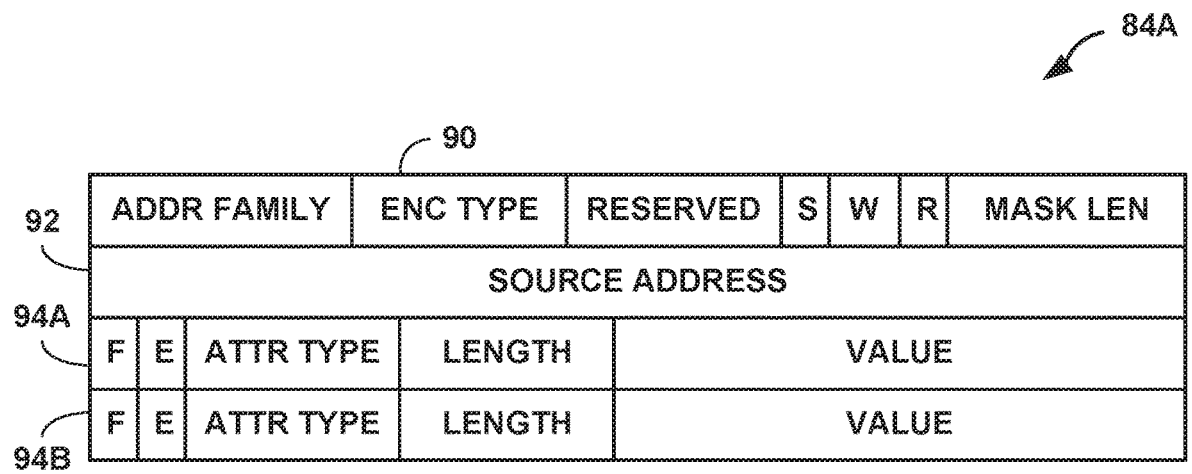
FIG. 6 is a conceptual diagram illustrating an example format of the Encoded-Source Address from FIG. 5 that includes the PIM join attribute used to carry priority values of multicast flows.

FIG. 6 is a conceptual diagram illustrating an example format of the Encoded-Source Address 84A from FIG. 5 that includes PIM join attributes 94A-94B used to carry a priority value for a multicast flow having a source address 92. The default PIM source encoding does not have any option to include an attribute field. The techniques of this disclosure use Encoded-Source Address 84A that introduces a new source encoding type 90 in which PIM join attributes 94A-94B are formatted as TLVs.

A new attribute type in this message format may be introduced and used to carry the priority value mappings for each of the multicast flows having source address 92. This information may be carried along with the PIM Join messages to the upstream routers that can retrieve and store the priority value mapping for each multicast flow. As long as all of the routers in the PIM domain understand the PIM joins with the new source encoding type 90, this attribute may be propagated to all the routers.

Figure 7:
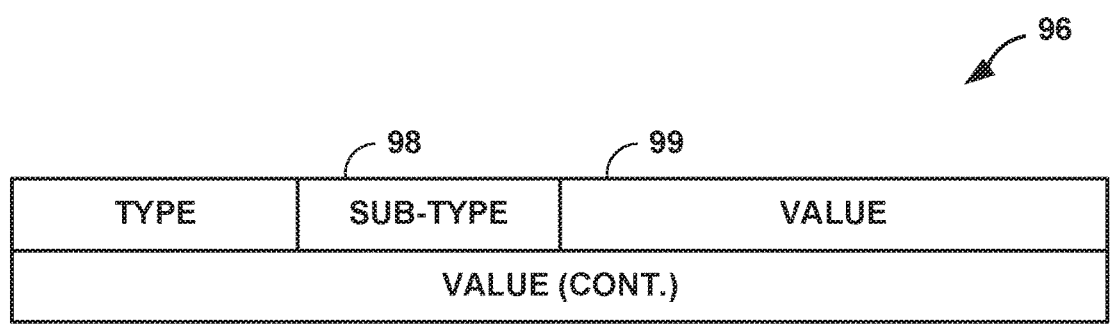
FIG. 7 is a conceptual diagram illustrating an example format of a community attribute for BGP MVPN routes used to propagate priority values of multicast flows included in PIM join messages.

FIG. 7 is a conceptual diagram illustrating an example format of a community attribute 96 for BGP MVPN routes used to propagate priority values of multicast flows included in PIM join messages. In order for the second approach described above to work across MVPN core 34 from FIG. 3, the priority value from the PIM join message may be transmitted via community attribute 96 in an MVPN route. Community attribute 96 may be introduced to carry the priority value for each of the multicast flows.

In BGP there exists an extended community attribute for each BGP route used to transmit any BGP or non-BGP specific information regarding or related to the route. The BGP extended community attribute is described in more detail in Sangli, S., et al., "BGP Extended Communities Attribute," IETF RFC 4360, 2006, the entire content of which is incorporated by reference herein. Some examples of existing extended communities are defined in Rosen, E., et al., "IANA Registries for BGP Extended Communities," IETF RFC 7153, 2014, the entire content of which is incorporated by reference herein. The MVPN Type 6 and Type 7 routes described above carry some of the extended communities like NOEXPORT and NOADVERTISE.

According to the disclosed techniques, the multicast flow priority value may also be transmitted over BGP to remote routers using the extended community attribute 96 on the MVPN routes. Since this value is applicable only to multicast, the transitive opaque extended community attribute may be used, the format of which is illustrated in FIG. 7. The extended community attribute 96 includes a new Sub-Type 98, which may be a multicast-flow-priority with a unique value (e.g., 0x0E) that is not currently being used by any other sub-types, and the Value field 100 may include the actual priority value associated with the PIM join entry.

In this example, the multicast flow priority value extracted from a PIM join attribute carried with a PIM join message from a downstream router can be placed into the extended community attribute 96. Extended community attribute 96 may be attached to the corresponding MVPN route type and transmitted over BGP to the remote routers where the priority value may be retrieved from the extended community attribute 96 and used to determine which multicast flow is preferred.

Figure 8:
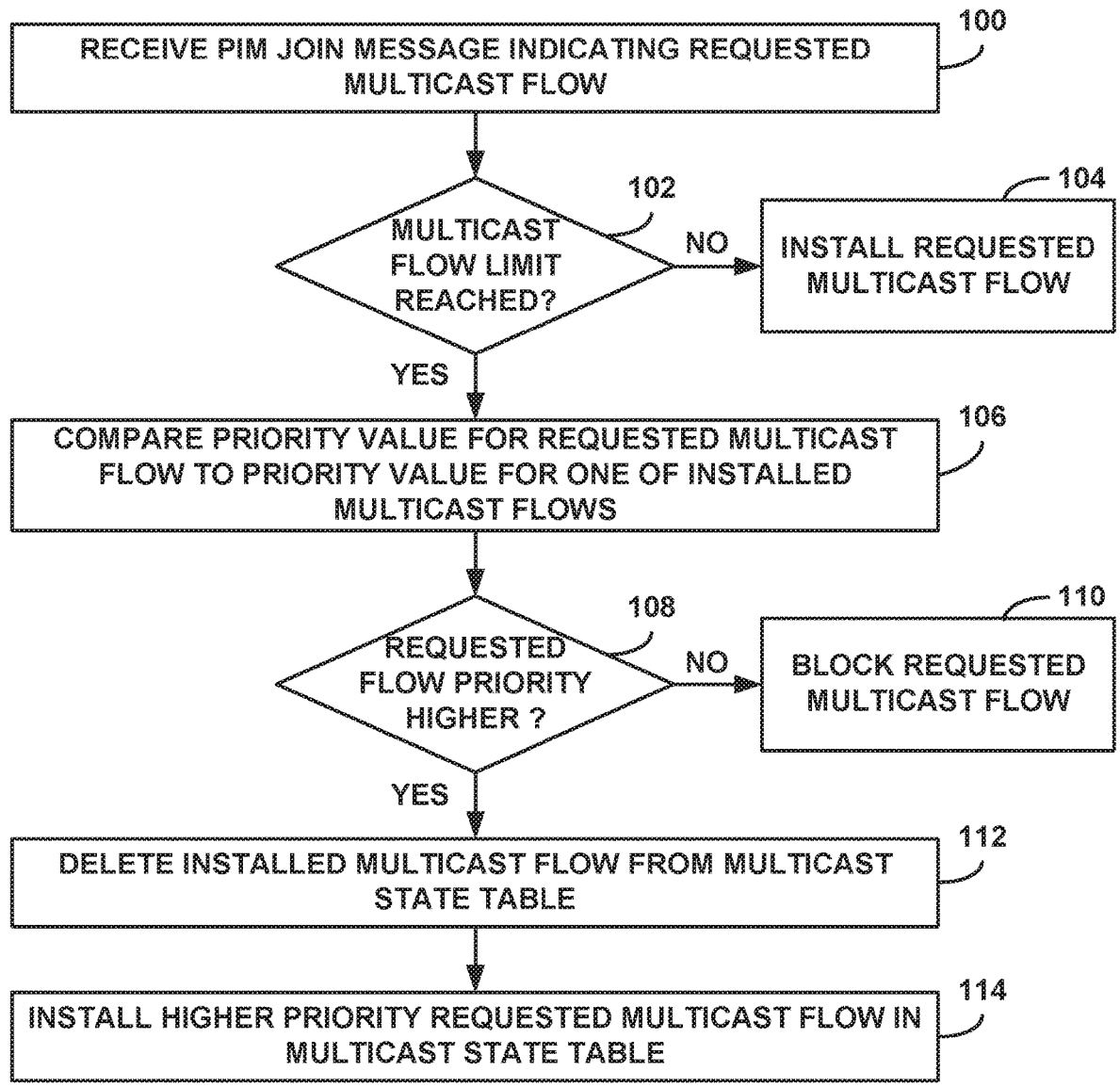
FIG. 8 is a flowchart illustrating an example operation of performing multicast flow prioritization in a PIM network with multicast flow limits, in accordance with the techniques of this disclosure.

FIG. 8 is a flowchart illustrating an example operation of performing multicast flow prioritization in a PIM network with multicast flow limits, in accordance with the techniques of this disclosure. The example operation is described herein with reference to router 50 from FIG. 4. In other examples, the operation may be performed by any of routers 20 within computer network 10 from FIGS. 1A-1B, any of RP 24 and routers 30 within computer network 22 from FIG. 2, or any of routers 40 within computer network 32 from FIG. 3.

Router 50 receives a PIM join message indicating at least one requested multicast flow within the PIM domain (100). The PIM join message may indicate the requested multicast flow by a unique multicast group address of the requested multicast flow. The PIM or multicast domain may include all sources and all receivers that use the same or at least partially overlapping multicast routes for the transfer of multicast traffic. In some examples the PIM or multicast domain may be defined by an OSPF area or an ASBR boundary. In general, the PIM or multicast domain does not cross different ASNs, which uniquely identify autonomous systems within the Internet.

In response to receipt of the PIM join message, routing engine 56 of router 50 determines whether a number of installed multicast flows in multicast state table 64 has reached a multicast flow limit associated with router 50 (102). The multicast flow limit associated with the router may be a network-wide multicast flow limit imposed on all routers within the PIM domain. As an example, the multicast flow limit may be set to 200 multicast flows. In other examples, the multicast flow limit may be greater than or less than 200 multicast flows. In the case where the multicast flow limit has not yet been reached (NO branch of 102), routing engine 56 installs the requested multicast flow in multicast state table 64 (104).

In the case where the multicast flow limit has been reached (YES branch of 102), priority unit 78 of router 50 compares a priority value for the requested multicast flow to a priority value for one of the installed multicast flows in multicast state table 64 (106). To determine the priority value for the requested multicast flow, priority unit 78 may extract the priority unit from either the received PIM join message or from priority table 80 stored on router 50.

In one example, the received PIM join message has a source encoding type that includes an attribute field used to carry the priority value for the requested multicast flow, as described in more detail above with respect to FIGS. 5 and 6. In this example, priority unit 78 extracts the priority value for the requested multicast flow from the PIM Join attributes of the new source encoding type used in the received PIM join message.

In another example, instead of receiving the priority value for the requested multicast flow in the PIM join message, router 50 may be pre-programmed with priority values for multicast flows within the PIM domain. For example, routing engine 56 may receive a set of priority values for multicast flows within the PIM domain either from an administrator via CLI 74, or from a centralized controller via an API. Each of the priority values included in the set of priority values may be mapped to a unique multicast group address of the respective one of the multicast flows within the PIM domain. Routing engine 56 may then store the set of priority values in priority table 80. In this example, priority unit 78 retrieves the priority value for the requested multicast flow from priority table 80 using the unique multicast group address of the requested multicast flow as an index into priority table 80.

To perform the comparison between the priority value for the requested multicast flow and the priority value of the installed multicast flows, priority unit 78 may first analyze each of the installed multicast flows in multicast state table 64 to identify a lowest one of the associated priority values. In one example, for each of the installed multicast flows, priority unit 78 may look up its associated priority value in priority table 80, and compare or order the priority values of the installed multicast flows to identify the lowest one of the priority values. In another example, multicast state table 64 may include an indication of which of the installed multicast flows has the lowest priority value, or may include the actual priority value for each of the installed multicast flows.

In some other examples, instead of first identifying the lowest priority value and then performing the comparison, priority unit 78 may compare the priority value for the requested multicast flow to each of the priority values for the installed multicast flows in multicast state table 64. Priority unit 78 may stop performing the comparisons upon identifying a priority value for one of the installed multicast flows that is lower than the priority value for the requested multicast flow. In this case, however, the lower priority value may not necessarily be the lowest priority value of the installed multicast flows.

In the case where the priority value of the requested multicast flow is lower than, or the same as, the priority value for the one of the installed multicast flows (NO branch of 108), routing engine 56 blocks the requested multicast flow (110) and does not modify multicast state table 64. If the priority value for the one of the installed multicast flows is not the lowest priority value of the installed multicast flows, then priority unit 78 may perform another comparison between the priority value for the requested multicast flow and a priority value for another one of the installed multicast flows in multicast state table 64 (106).

In the case where the priority value of the requested multicast flow is higher than the priority value for the one of the installed multicast flows (YES branch of 108), routing engine 56 deletes the one of the installed multicast flows from multicast state table 64 (112). Routing engine 56 then installs the requested multicast flow in the available entry of multicast state table 64 (114). Routing engine 56 also installs a multicast route for the requested multicast flow into forwarding information 76 on forwarding engine 58 of router 50. Forwarding engine 58 of router 50 may then forward received multicast traffic of the requested multicast flow according to the installed multicast route in forwarding information 76.

After receiving the PIM join message for the requested multicast flow, router 50 may perform different operations depending on the type of router 50 or the type of network in which router 50 is included.

In one example, router 50 is a LHR connected to a receiver that is interested in receiving the requested multicast flow. For example, LHR 50 may operate substantially similar to one of R3 20C or R4 20D from FIGS. 1A-1B, one of R3 30C or R4 30D from FIG. 2, or one of R4 40D or R6 40F from FIG. 3. According to some examples of this disclosure, LHR 50 is pre-programmed with a set of priority values for multicast flows within the PIM domain, and the set of priority values is stored in priority table 80. In this case, the PIM join message received by LHR 50 may not include the priority value for the requested multicast flow. Upon receipt of the PIM join message (100), LHR 50 determines the priority value for the requested multicast flow from priority table 80, and performs the comparison described above (106).

Based on the installation of the requested multicast flow in multicast flow table 64 (114), LHR 50 sends a new PIM join message indicating the requested multicast flow and the priority value for the requested multicast flow to an upstream neighbor router. The new PIM join message created by LHR 50 may have a source encoding type that includes an attribute field used to carry the priority value for the requested multicast flow. In the above example, only LHRs in the PIM domain may be pre-programmed with the set of priority values for the multicast flows, and the priority values for requested multicast flows may be propagated to the upstream routers via the new PIM join messages.

In another example, router 50 is a RP router in a PIM ASM network. For example, RP 50 may operate substantially similar to RP 24 from FIG. 2. According to some examples of this disclosure, RP 50 is pre-programmed with a set of priority values for multicast flows within the PIM domain, and the set of priority values is stored in priority table 80. In this case, since RP 50 is the root of all multicast joins and stores information for all multicast flows in the network, RP 50 is also configured to perform multicast flow prioritization for all multicast flows in the network. Upon receipt of the PIM join message (100), RP 50 determines the priority value for the requested multicast flow from priority table 80, and performs the comparison described above (106).

Based on the deletion of the one of the installed multicast flows from multicast state table 64 (112), RP 50 sends a PIM prune message toward a source of the deleted multicast flow. By sending the PIM prune message to the source, RP 50 will stop receiving traffic for the deleted multicast flow from the source and, thus, will stop forwarding traffic of the deleted multicast flow to downstream routers. In this way, the deleted multicast flow previously installed on the downstream routers will time out and be removed from the multicast state tables of the downstream routers.

Based on the installation of the requested multicast flow in multicast flow table 64 (114), RP 50 propagates the PIM join message toward a source of the requested multicast flow. By sending the PIM join message to the source, RP 50 will begin receiving traffic for the requested multicast flow from the source and, thus, will begin forwarding traffic of the requested multicast flow to interested downstream routers. In this way, once the deleted multicast flow is timed out and removed from the downstream routers, the downstream routers will install the requested multicast flow in their multicast state tables and begin forwarding the traffic of the requested multicast flow to interested receivers. In above example, only the RP in the PIM domain may be pre-programmed with the set of priority values for the multicast flows, and the installed multicast flows may be propagated to the downstream routers.

In an additional example, router 50 is a PE router included in a MVPN with one or more remote PE routers. For example, PE 50 may operate substantially similar to one of R3 40C or R5 40E on MVPN core 34 from FIG. 3. Upon receipt of the PIM join message (100), PE 50 determines the priority value for the requested multicast flow from either priority table 80 or from the received PIM join message, and performs the comparison described above (106).

Based on the installation of the requested multicast flow in multicast flow table 64 (114), PE 50 converts the received PIM join message into a MVPN join route with an extended community attribute used to carry the priority value for the requested multicast flow, as described in more detail above with respect to FIG. 7. PE 50 then transmits the MVPN join route with the extended community attribute to at least one of the remote PE routers via BGP. In the above example, either the LHRs are pre-programmed with the set of priority values for the multicast flows or all routers in the PIM domain are pre-preprogrammed with the set of priority values for the multicast flows. In either case, PE routers on the MVPN core propagate the priority values for requested multicast flows across the MVPN core to the remote upstream routers via the new extended community attribute of the MVPN join routes.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples of the invention have been described. These and other examples are within the scope of the following claims.

What is claimed is:

1. A method comprising:
receiving, by a router, a protocol independent multicast (PIM) join message indicating at least one requested multicast flow, wherein the received PIM join message has a source encoding type that includes an attribute field used to carry a priority value for the requested multicast flow;
determining, by the router, whether a number of installed multicast flows in entries of a multicast state table stored at the router has reached a multicast flow limit associated with the router such that the multicast state table has no available entries, wherein each multicast flow is associated with a unique multicast group address, and wherein each of the installed multicast flows in the multicast state table has an associated multicast route for the unique multicast group address installed in forwarding information of the router;
based on the multicast flow limit being reached, comparing, by the router, the priority value for the requested multicast flow to a priority value for one of the installed multicast flows in the multicast state table, wherein each of the priority value for the requested multicast flow and the priority value for the one of the installed multicast flows comprises an identifier defined to indicate a priority associated with a preference for a customer to receive multicast traffic carried by the respective multicast flow; and
determining, by the router, whether to install the requested multicast flow in the multicast state table based on the comparison, wherein determining whether to install the requested multicast flow comprises:
based on the priority value for the requested multicast flow being higher than the priority value for the one of the installed multicast flows, deleting the one of the installed multicast flows from the multicast state table such that the multicast state table has at least one available entry,
installing the requested multicast flow in the available entry of the multicast state table, and
installing an associated multicast route for the unique multicast group address associated with the requested multicast flow into the forwarding information of the router.

2. The method of claim 1, wherein the priority value for the one of the installed multicast flows is a lowest priority value of the installed multicast flows in the multicast state table.

3. The method of claim 1, wherein the router is a provider edge (PE) router included in a multicast virtual private network (MVPN) with one or more remote PE routers, the method further comprising:
converting the PIM join message into a MVPN join route with an extended community attribute used to carry the priority value for the requested multicast flow; and
transmitting the MVPN join route with the extended community attribute to at least one of the remote PE routers via a border gateway protocol (BGP).

4. The method of claim 1, wherein, based on the multicast flow limit being not yet reached, installing the requested multicast flow in the multicast state table.

5. The method of claim 1, wherein determining whether to install the requested multicast flow comprises, based on the priority value for the requested multicast flow being lower than the priority value for the one of the installed multicast flows, blocking the requested multicast flow from being installed in the multicast state table having no available entries.

6. The method of claim 1, further comprising forwarding multicast traffic of the requested multicast flow according to the installed multicast route.

7. A method comprising:
receiving, by a router, a set of priority values for multicast flows within a protocol independent multicast (PIM) domain, wherein each of the multicast flows is associated with a unique multicast group address, and wherein each of the priority values in the set of priority values is mapped to a unique multicast group address associated with a respective one of the multicast flows within the PIM domain;
storing, by the router, the set of priority values in a priority table at the router;
receiving, by the router, a PIM join message indicating at least one requested multicast flow;
determining, by the router, whether a number of installed multicast flows in entries of a multicast state table stored at the router has reached a multicast flow limit associated with the router such that the multicast state table has no available entries, wherein each of the installed multicast flows in the multicast state table has an associated multicast route for the unique multicast group address installed in forwarding information of the router;
based on the multicast flow limit being reached, comparing, by the router, a priority value for the requested multicast flow to a priority value for one of the installed multicast flows in the multicast state table, wherein the set of priority values stored in the priority table includes the priority value for the requested multicast flow and the priority value for the one of the installed multicast flows, and wherein each of the priority value for the requested multicast flow and the priority value for the one of the installed multicast flows comprises an identifier defined to indicate a priority associated with a preference for a customer to receive multicast traffic carried by the respective multicast flow; and determining, by the router, whether to install the requested multicast flow in the multicast state table based on the comparison, wherein determining whether to install the requested multicast flow comprises:
- based on the priority value for the requested multicast flow being higher than the priority value for the one of the installed multicast flows, deleting the one of the installed multicast flows from the multicast state table such that the multicast state table has at least one available entry,
- installing the requested multicast flow in the available entry of the multicast state table, and
- installing an associated multicast route for the unique multicast group address associated with the requested multicast flow into the forwarding information of the router.

8. The method of claim 7, wherein the router comprises a last hop router (LHR) connected to a receiver that is interested in receiving the requested multicast flow, the method further comprising:
- determining the priority value for the requested multicast flow from the priority table; and
- sending, by the LHR and to an upstream neighbor router, another PIM join message indicating the requested multicast flow, the another PIM join message having a source encoding type that includes an attribute field used to carry the priority value for the requested multicast flow.

9. The method of claim 7, wherein the router comprises a rendezvous point (RP) router operating in a PIM Any Source Multicast (ASM) mode, the method further comprising:
- determining the priority value for the requested multicast flow from the priority table;
- based on the deletion of the one of the installed multicast flows from the multicast state table, sending a PIM prune message toward a source of the deleted one of the installed multicast flows; and
- based on the installation of the requested multicast flow in the multicast state table, propagating the PIM join message toward a source of the requested multicast flow.

10. A router comprising:
- a memory configured to store a multicast state table including one or more installed multicast flows, wherein each multicast flow is associated with a unique multicast group address, and wherein each of the installed multicast flows in the multicast state table has an associated multicast route for the unique multicast group address installed in forwarding information of the router; and
- one or more processors in communication with the memory and configured to:
  - receive a protocol independent multicast (PIM) join message indicating at least one requested multicast flow, wherein the received PIM join message has a source encoding type that includes an attribute field used to carry a priority value for the requested multicast flow;
  - determine whether a number of the installed multicast flows in entries of the multicast state table has reached a multicast flow limit associated with the router such that the multicast state table has no available entries;
  - based on the multicast flow limit being reached, compare the priority value for the requested multicast flow to a priority value for one of the installed multicast flows, wherein each of the priority value for the requested multicast flow and the priority value for the one of the installed multicast flows comprises an identifier defined to indicate a priority associated with a preference for a customer to receive multicast traffic carried by the respective multicast flow; and
  - determine whether to install the requested multicast flow in the multicast state table based on the comparison, wherein the one or more processors are configured to:
    - based on the priority value for the requested multicast flow being higher than the priority value for the one of the installed multicast flows, delete the one of the installed multicast flows from the multicast state table such that the multicast state table has at least one available entry,
    - install the requested multicast flow in the available entry of the multicast state table, and
    - install an associated multicast route for the unique multicast group address associated with the requested multicast flow into the forwarding information of the router.

11. The router of claim 10, wherein the priority value for the one of the installed multicast flows is a lowest priority value of the installed multicast flows in the multicast state table.

12. The router of claim 10, wherein the router is a provider edge (PE) router included in a multicast virtual private network (MVPN) with one or more remote PE routers, and wherein the one or more processors are configured to:
- convert the PIM join message into a MVPN join route with an extended community attribute used to carry the priority value for the requested multicast flow; and
- transmit the MVPN join route with the extended community attribute to at least one of the remote PE routers via a border gateway protocol (BGP).

13. The router of claim 10, wherein the one or more processors are configured to, based on the multicast flow limit being not yet reached, install the requested multicast flow in the multicast state table.

14. The router of claim 10, wherein the one or more processors are configured to, based on the priority value for the requested multicast flow being lower than the priority value for the one of the installed multicast flows, block the requested multicast flow from being installed in the multicast state table having no available entries.

15. The router of claim 10, wherein the one or more processors are configured to forward multicast traffic of the requested multicast flow according to the installed multicast route.

16. A router comprising:
- a memory configured to store a multicast state table including one or more installed multicast flows, wherein each multicast flow is associated with a unique multicast group address, and wherein each of the installed multicast flows in the multicast state table has an associated multicast route for the unique multicast group address installed in forwarding information of the router; and
- one or more processors in communication with the memory and configured to:
  - receive a set of priority values for multicast flows within a protocol independent multicast (PIM)

domain, wherein each of the priority values in the set of priority values is mapped to the unique multicast group address associated with a respective one of the multicast flows within the PIM domain;

store the set of priority values in a priority table included in the memory receive a PIM join message indicating at least one requested multicast flow;

determine whether a number of the installed multicast flows in entries of the multicast state table has reached a multicast flow limit associated with the router such that the multicast state table has no available entries;

based on the multicast flow limit being reached, compare a priority value for the requested multicast flow to a priority value for one of the installed multicast flows, wherein the set of priority values stored in the priority table includes the priority value for the requested multicast flow and the priority value for the one of the installed multicast flows, and wherein each of the priority value for the requested multicast flow and the priority value for the one of the installed multicast flows comprises an identifier defined to indicate a priority associated with a preference for a customer to receive multicast traffic carried by the respective multicast flow; and determine whether to install the requested multicast flow in the multicast state table based on the comparison, wherein the one or more processors are configured to:
  based on the priority value for the requested multicast flow being higher than the priority value for the one of the installed multicast flows, delete the one of the installed multicast flows from the multicast state table such that the multicast state table has at least one available entry,
  install the requested multicast flow in the available entry of the multicast state table, and
  install an associated multicast route for the unique multicast group address associated with the requested multicast flow into the forwarding information of the router.

17. The router of claim 16, wherein the router comprises a last hop router (LHR) connected to a receiver that is interested in receiving the requested multicast flow, and wherein the one or more processors are configured to:
  determine the priority value for the requested multicast flow from the priority table; and
  send, to an upstream neighbor router, another PIM join message indicating the requested multicast flow, the another PIM join message having a source encoding type that includes an attribute field used to carry the priority value for the requested multicast flow.

18. The router of claim 16, wherein the router comprises a rendezvous point (RP) router operating in an PIM Any Source Multicast (ASM) mode, and wherein the one or more processors are configured to:
  determine the priority value for the requested multicast flow from the priority table;
  based on the deletion of the one of the installed multicast flows from the multicast state table, send a PIM prune message toward a source of the deleted one of the installed multicast flows; and
  based on the installation of the requested multicast flow in the multicast state table, propagate the PIM join message toward a source of the requested multicast flow.

* * * * *